Dec. 5, 1939.  D. W. GRISWOLD  2,182,556
METHOD AND APPARATUS FOR PRESERVATION OF PERISHABLE FOODSTUFFS
Filed April 20, 1937   2 Sheets-Sheet 1

DONALD W. GRISWOLD
INVENTOR
BY
ATTORNEY

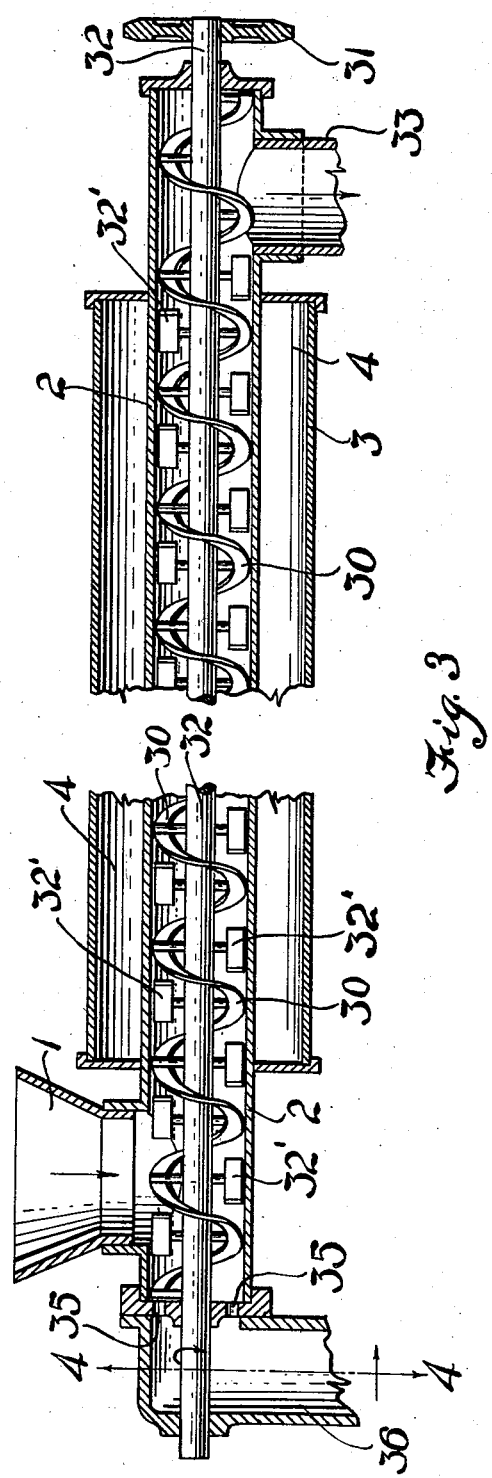
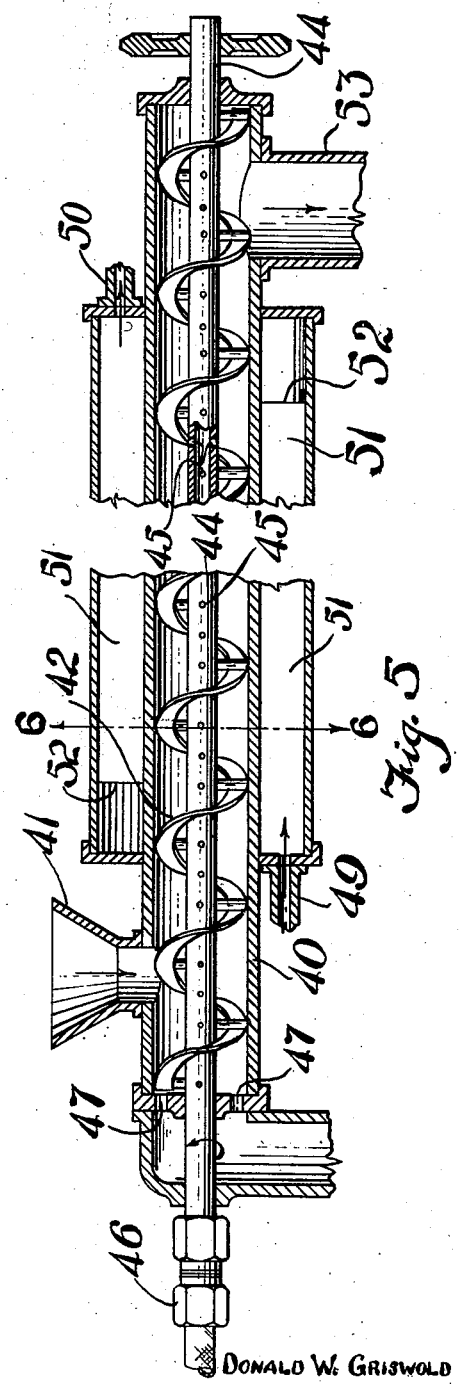

Patented Dec. 5, 1939

2,182,556

UNITED STATES PATENT OFFICE 2,182,556

METHOD AND APPARATUS FOR PRESERVATION OF PERISHABLE FOODSTUFFS

Donald W. Griswold, Bridgeton, N. J.

Application April 20, 1937, Serial No. 137,950

8 Claims. (Cl. 62—102)

This invention relates to a method and apparatus for the preservation of perishable foodstuffs, such as, fresh vegetables, berries, fruit, et cetera, and more particularly to the preserving of such foodstuffs by freezing.

With the present type of apparatus for preserving foodstuffs by freezing, the foodstuffs are frozen in packages or blocks either in what is known as the cabinet type of freezing apparatus or on the endless conveyor type. The use of these types of freezing apparatus and the freezing of the foodstuffs in packages, pans or in bulk, requires considerable labor, particularly in the cabinet type of freezing apparatus, and in all instances freezing of the foodstuffs in blocks or packages of predetermined sizes. The freezing of the foodstuffs in blocks or packages not only requires a relatively long time to thoroughly freeze them through to the center of the block or package, but requires that they be sold or used in definite predetermined quantities. Frequently a housewife does not require an entire block of foodstuffs for her needs; then she must cut the block to obtain the desired quantity.
The freezing of the foodstuffs in blocks or packages also requires a relatively long time to thaw them out in readiness for cooking or eating. If the blocks are broken up to facilitate thawing this crushes and mutilates some of the individual pieces or units and is particularly undesirable in connection with berries and fruits which are used as dessert and are desired to appear attractive when placed on the table.

An object of the present invention is to provide a new and novel method and apparatus for freezing foodstuffs by means of which the units or pieces of food are frozen individually, that is, each pea, lima bean, leaf of spinach, cob of corn, string bean, raspberry, strawberry, et cetera, is individually frozen in a continuous quick freezing method which materially cuts down the time required for freezing, reduces to a minimum manual labor required in handling the foodstuffs, and permits the frozen foodstuffs to be dispensed and used in any desired quantity.

The present method and apparatus provides that each and every individual piece or portion of a fruit or vegetable is subjected to an instantaneous and uniform application of precooled air as it enters the freezing apparatus and that it is continuously moved through the freezing apparatus during such movement so that it will be uniformly subjected to the action of the refrigerant, thereby freezing it more quickly than has been done heretofore with approved commercial apparatus now in use. By the quick freezing of the foodstuffs all the natural flavor and quality are retained and preserved, because the cellular construction of the foodstuffs remain unbroken and unchanged.

Another object of the present invention is the provision of a food freezing apparatus which will be self-defrosting, that is, it will prevent the accumulation of frost on the heat-exchange surfaces thereof and consequently the continuous action of the apparatus is constant and unchanging, and also the apparatus will produce a product of better quality than can be produced by the present approved type of apparatus and at a lower cost.

A further object of the present invention is the provision of an apparatus for freezing foodstuffs which is designed and constructed to permit the use of volatile refrigerants as the refrigerating medium, with its consequent many advantages and savings in initial cost of equipment and in subsequent operating costs. The apparatus is constructed so as to prevent any possibility of the foodstuffs absorbing odors or having its flavor impaired by the use of a volatile refrigerant.

The present method and apparatus of continuous and individual freezing of foodstuffs will synchronize with the present approved methods of continuous flow of vegetables or fruits through the lines or apparatus employed in the preparation of fruits and vegetables for canning, and will eliminate delays caused by manual handling, or holding by accumulation of such foodstuffs after preparation which often results in spoilage and as is occasioned in the use of the present package or bulk freezing apparatus.

With these and other objects in view, as may appear from the accompanying specification, the invention consists of various features of construction and combination of parts, which will be first described in connection with the accompanying drawings, showing a method and apparatus for preservation of perishable foodstuffs of the preferred form embodying the invention, and the features forming the invention will be specifically pointed out in the claims.

In the drawings:

Figure 3 is a longitudinal section through the apparatus taken approximately on the line 3—3 of Figure 2.

Figures 1, 2, 4, 6:
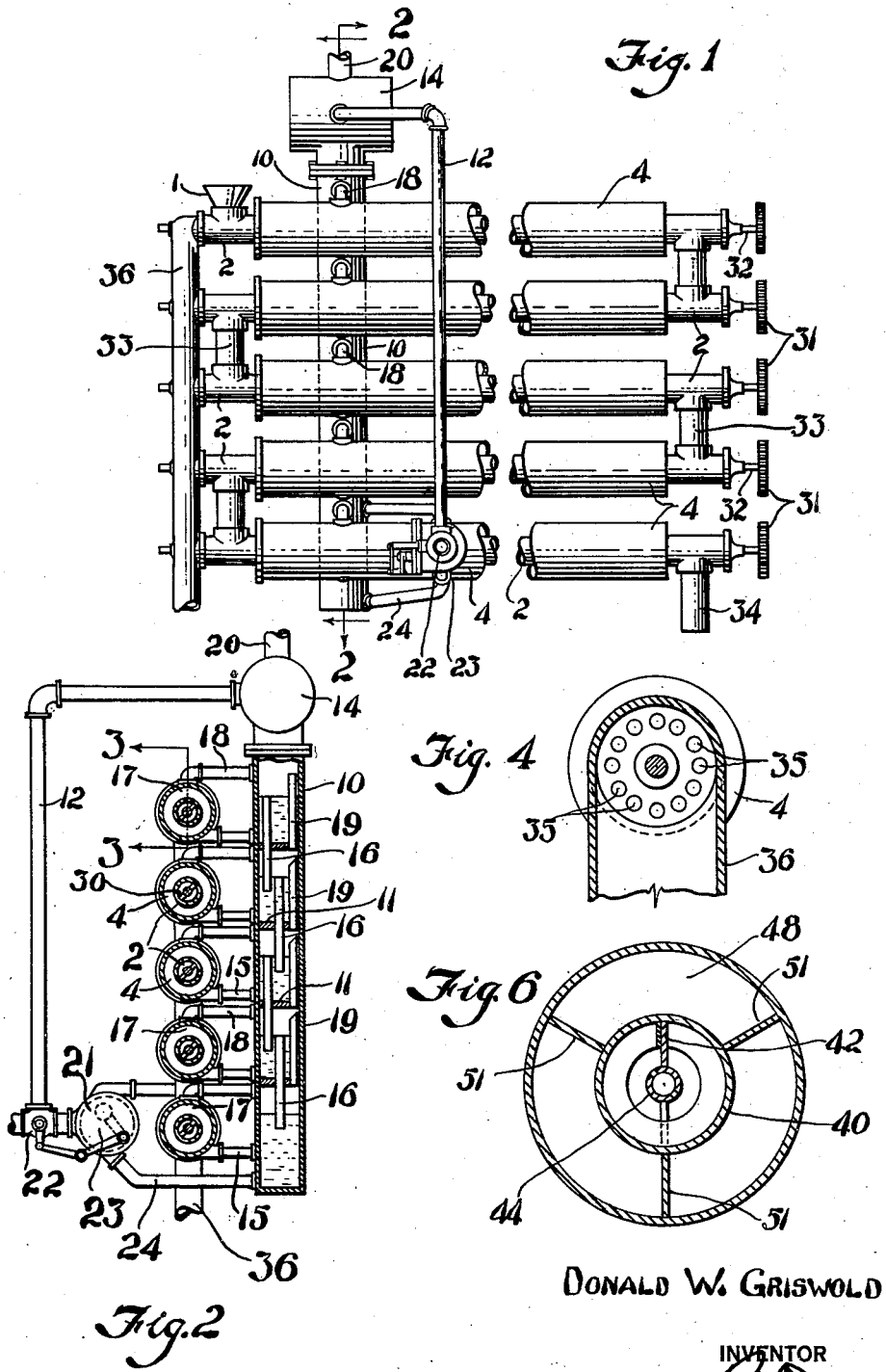
Figure 1 is a side elevation of a food-preserving apparatus constructed in accordance with the present invention and having parts thereof broken away.
Figure 2 is a vertical section taken on the line 2—2 of Figure 1.

Figure 4 is a detail section on the line 4—4 of Figure 3.

Figure 5 is a longitudinal section through a modified form of the unit.

Figure 6 is a cross section on the line 6—6 of Figure 5.

Referring more particularly to the drawings, the type of apparatus for preserving foodstuffs by freezing, shown in Figures 1 to 4 inclusive, is a type particularly adapted for the use of a volatile refrigerant as the refrigerant medium.

In the carrying out of the present method of freezing foodstuffs the foodstuffs are first prepared in the usual manner and required method and after such preparation are fed in any suitable manner to the inlet or receiving-hopper 1 of the freezing apparatus.

The freezing apparatus comprises a plurality of pipes or tubes 2 which are arranged, preferably in superposed relation, or may be arranged in any suitable series relation to receive the foodstuffs, one from the preceding one. The tubes 2 have their major portions encased in refrigerant-forming housings or tubes 3 which are spaced from the food-carrying tubes 2 to provide refrigerant-containing chambers 4 about the food-carrying tubes.

Refrigerant of any suitable type, preferably volatile refrigerant is delivered to the respective refrigerant chambers 4 by a suitable structure which will insure the delivery of the proper amount of refrigerant to the refrigeration or evaporator chambers 4 without the need of a refrigerant circulating pump and its necessary appendages. Also the refrigerant distributing means is self-regulating.

The refrigerant distributing structure includes a distributor 10 which is shown in the form of a vertical stand-pipe and it has a plurality of partitions 11 therein which correspond to the various vertical tiers of the evaporator chambers 4. The partitions 11 are located slightly below the lowermost part of the respective tier of evaporator chambers and form pockets in the distributor 10 which are individual to each of the evaporator chambers. A volatile refrigerant is supplied from any suitable source (not shown) through a supply pipe 12 to the accumulator 14. The accumulator 14 is mounted at the top of the distributor 10 and opens thereinto so that the liquid refrigerant delivered to the accumulator 14 may pass downwardly into the distributor 10.

Each of the pockets in the distributor 10 formed by the partitions 11 is connected by suitable supply pipes 15 to the respective evaporator chamber 4.

Pipes 16 extend through the partitions 11, extending a predetermined distance above and below the partitions and form the only means of refrigerant delivery communication between the respective pockets. It will, therefore, be necessary for the liquid refrigerant to rise above the tops of these overflow pipes before any liquid refrigerant will be supplied to the pocket next therebelow. The overflow pipes 16 project upwardly into the pockets a predetermined distance for regulating the height of the liquid refrigerant in the evaporator chambers 4.

The overflow pipes 16 are of such height that there will always be left a gas pocket as indicated at 17 in the uppermost portions of the evaporator chambers 4, and these gas pockets are connected by pipes 18 to the respective pockets in the distributor above the tops of the overflow pipes 16. The evaporated liquid refrigerant thus passes from the evaporator sections or chambers 4 through the pipes 18 into the distributor pockets and passes from one distributor pocket, through a gas outlet or tube 19 into the next pocket thereabove and thence onwardly through the series of pockets in the accumulator 14. Any condensation of the gases or evaporated liquid refrigerant will pass or fall downwardly into the respective distributor pockets and be recirculated. A suitable gas take-off as indicated at 20 may be provided. The supply of liquid refrigerant to the accumulator 14 and consequently to the distributor 10 is controlled by the level of the liquid refrigerant in the lowermost tier of evaporating chambers 4 by a float mechanism 21, of any approved type, which in turn controls the valve 22. The float mechanism 21 includes the tank or condenser 23 which is connected by the pipe 24 to the bottom of the distributor 10 and is placed so that the level of the liquid refrigerant within the tank 23 will be level with the level of liquid refrigerant in the evaporator chamber 4 of the lowermost of the freezing or evaporator units. Since the evaporator chamber 4 in the lowermost unit is the last to receive the liquid refrigerant and the float structure 21 is arranged to open the valve 22 until such time as the level of the liquid refrigerant in the lowermost evaporator chamber 4 reaches the desired height, the chilling apparatus will be self-regulated and the quantity of liquid refrigerant delivered thereto will be controlled by the actual needs of the apparatus.

The foodstuffs entering the tubes or pipes 2 are picked up by the spiral-blade conveyor 30 which feeds or conveys the individual particles or units of food through the tubes 2. The spiral conveyor structures 30 may be rotated at any desired speed from any suitable power source (not shown) through the medium of sprockets 31 and the spiral blade-carrying shafts 32. The speed of the feeding of the particles of food through the tubes is regulated in accordance with the freezing action or heat-exchange action of the volatile refrigerant in the various evaporating or refrigerant chambers 4.

The shaft 32 may have a plurality of agitating paddles or stirring blades 32' thereon at spaced intervals along its length for stirring or agitating the foodstuffs as they are fed through the tube 2. If it is so desired the conveyor structure may itself be so constructed in accordance with standard conveyor practice to agitate or stir the foodstuffs during their passage through the tube 2.

The conveyors and agitating paddles will roll and agitate the various particles of food during their passage through the tubes 2 so that all parts of the pieces or particles of food will be uniformly subjected to the freezing action, resulting in uniformly frozen food particles. Some of the air which is delivered to the tube or tubes will leak out of the ends of the tube through the joints and around the shafts, and that which does not leak out of the tubes will pass through the tubes and out the final outlet 34 with the frozen foodstuffs.

In Figures 1 and 2 of the drawings, a plurality of the freezing units are shown, connected in series and the food particles or units pass longitudinally through one freezing unit from its inlet end to its outlet end, and drop by gravity through connections 33 to the inlet of the next unit, being delivered from the unit end of the final freezing unit through a discharge 34, into any suitable type of containers or packaging means.

It is to be understood, that if it is desired only one freezing unit may be employed which is of sufficient length that the proper freezing of the foodstuffs may be obtained by their passage through this single freezing unit.

The inlet ends of the food-receiving tubes 2 are provided with a plurality of openings 35 through which precooled air is admitted to the tubes from any suitable source (not shown), and by any suitable means such as the conduit 36. Thus the food particles or units are subjected to a blast of uniform precooling air when they first enter the freezing apparatus and are subsequently subjected to blasts of air at regular intervals through their continued passage through the series of freezing or heat-exchange units.

The spiral-blade screw conveyors, rotating at a relatively slow speed will gently and continuously move the foodstuffs through the freezing or heat-exchange unit and every individual piece or portion of a fruit or vegetable will be subjected to uniform application of heat exchange or freezing action, and this together with the application of the precooled air to the foodstuffs will insure rapid freezing and the maintenance of the full natural flavor and quality of the foodstuffs, because the cellular construction thereof will remain unbroken and unchanged.

The spiral-blade screw conveyors just touch or engage the inner walls of the tubes or pipes 2 so that they will form scrapers and prevent the accumulation of frost on the walls of the tube which causes impairment of the heat-exchange properties of the apparatus. In other words, the freezing or heat-exchange units will be self-defrosting and the foodstuffs passing therethrough will always be subjected to uniform freezing or heat-exchange conditions.

In Figures 5 and 6 of the drawings, a modified form of the freezing or heat-exchange unit is shown, this form being particularly adapted for use in connection with a non-volatile refrigerant.

The modified form of the invention comprises a foot-receiving tube 40 into which the particles of food are delivered through a suitable inlet hopper 41 and in which is positioned spiral-blade screw type conveyor 42, similar to the conveyor shown in Figures 1 to 3 inclusive of the drawings. The spiral blade 43 of the conveyor 42 is carried by a suitable operating shaft 44 which is rotated in any suitable manner, and the spiral blade 43 scrapes the inner wall of the tube 40 to prevent the accumulation of frost thereon.

The shaft 44, however, is hollow and is provided with a plurality of radial perforations 45 at longitudinally spaced points therein. The hollow shaft 44 has connection with a supply source (not shown) of precooled air under a predetermined pressure such as through a connection shown at 46. Therefore, during the passage of the foodstuffs through the tube 40 they will be constantly subjected to blasts of precooled air.

The foodstuffs may also be subjected to the blasts of precooled air through the openings 47 in the same manner in which the precooled air is supplied to the tubes 2.

The tube 40 has its major portion surrounded by a refrigerating chamber 48 which has an inlet 49 for non-volatile refrigerant at one end thereof, and an outlet 50 for the refrigerant at the other end. Longitudinally extending baffles 51 are placed in the refrigerant chamber 48 and they are disposed staggeredly, that is, they terminate short of the ends of the chamber at opposite ends thereof as shown at 52 in Figure 5 of the drawings, so as to compel the refrigerant which is pumped through the chamber 48 to pass therethrough in a sinuous or multi-pass path to enhance the heat-exchange action thereof and consequently increase the freezing action of the foodstuffs passing through the food tube 40. The discharge of the frozen foods is preferably by gravity through a discharge tube shown at 53. If it is so desired the hollow shaft arrangement shown in Figures 5 and 6 of the drawings may be used in the type of refrigerating unit adapted for use of a volatile refrigerant, without departing from the spirit of the present invention, and the freezing units adapted for use of a non-volatile refrigerant may be connected in series to provide a multi-unit apparatus, in any desired or preferred arrangement, or they may be used singly, without departing from the spirit of the present invention, and it is also to be understood that the invention is not to be limited to the particular apparatus illustrated for the circulaion of the volatile refrigerant but that other pracical structures may be employed.

In all of the drawings and hereinabove the conveyors have been referred to as spiral-blade screw type propellers with or without agitating paddles, but it is to be understood that the invention is not to be limited to spiral-blade screw type conveyors, or any other specific type of conveyor, but that any of many well-known types of conveyors applicable for feeding the foodstuffs through the tubes may be used without departing from the spirit of the present invention.

Also it may be desirable to employ various gases instead of air in the freezing of the foodstuffs, and it is to be understood that such use falls within the scope of the present invention.

It will be understood that the invention is not to be limited to the specific construction or arrangement of parts shown but that they may be widely modified within the invention defined by the claims.

What is claimed is:

1. In an apparatus for freezing foodstuffs, a plurality of heat-exchange units arranged in series, each of said units comprising a food-receiving tube and a conveyor therein, the discharge end of each tube being connected to the entrance end of the succeeding tube in the series and arranged whereby the foodstuffs will fall by gravity from one tube to the succeeding tube, refrigerant chambers surrounding the major portions of said tubes, said tubes provided with openings to admit precooled air thereinto, and means for conveying precooled air to said openings.

2. In an apparatus for freezing foodstuffs, a food-receiving tube, a conveyor in said tube for feeding the foodstuffs in continuous motion through the tube and agitating it during its passage, a refrigerant chamber surrounding the major portion of said tube, a rotating shaft for said conveyor, said shaft being hollow and provided with perforations to permit ejection of air from the shaft into the tube.

3. The method of freezing foodstuffs which consists in substantially continuously moving individual pieces of foodstuff in heat exchange relationship with a liquid refrigerating medium for freezing the pieces of foodstuff individually, and subjecting the pieces of foodstuff to a blast of cooled air at the start of their movement in heat exchange relationship with the refrigerating medium.

4. The method of freezing foodstuffs which consists in substantially continuously moving individual pieces of fruit or vegetables in heat exchange relationship with a refrigerating medium for freezing the pieces of fruit or vegetables individually, subjecting the pieces of fruit or vegetables to a blast of cooled air at the start of their movement in heat exchange relationship with the refrigerant medium to quickly form a frozen outer crust on the pieces of fruit or vegetables, and agitating the pieces of fruit or vegetables to cause a tumbling movement thereof during their movement in heat exchange relationship with said refrigerating medium.

5. The method of freezing foodstuffs which consists in substantially continuously moving individual pieces of fruit or vegetables in heat exchange relationship with a refrigerating medium for freezing the pieces of fruit or vegetables individually, subjecting the pieces of fruit or vegetables to a blast of cooled air at the start of their movement in heat exchange relationship with the refrigerant medium to quickly form a frozen outer crust on the pieces of fruit or vegetables, agitating the pieces of fruit or vegetables to cause a tumbling movement thereof during their movement in heat exchange relationship with said refrigerating medium, and further subjecting the pieces of fruit or vegetables to successive blasts of precooled air during their movement in heat exchange relationship with said refrigerating medium.

6. In an apparatus for freezing foodstuffs, a food receiving tube, a conveyor in said tube for feeding foodstuffs in continuous motion through the tube, means for delivering precooled air to said foodstuff at the entrance end of the tube, and agitators in said tube for engaging foodstuffs therein independently of said conveyor to cause a tumbling agitated movement of the foodstuffs out of the normal path of the foodstuffs caused by said conveyor during passage to the tube.

7. In an apparatus for freezing foodstuffs, a food receiving tube, a conveyor in said tube for feeding foodstuffs in continuous motion through the tube, means for delivering precooled air to the entrance end of the tube, and means for delivering precooled air into said tube at spaced points along its length.

8. In an apparatus for freezing foodstuffs, a food receiving tube, a conveyor in said tube for feeding foodstuffs in continuous motion through the tube, a refrigerant chamber surrounding the major portion of said tube, a rotating shaft for said conveyor, foodstuff agitating paddles on said shaft arranged to break up the normal passage of the foodstuffs as they are conveyed by said conveyer, and means for delivering precooled air to one end of said tube and into the tube in a direction transversely of the direction of entrance of the foodstuffs into the tube.

DONALD W. GRISWOLD.